United States Patent
Kaappa

(10) Patent No.: US 7,269,602 B2
(45) Date of Patent: Sep. 11, 2007

(54) METHOD AND DEVICE FOR DEFINING OBJECTS ALLOWING ESTABLISHMENT OF A DEVICE MANAGEMENT TREE FOR MOBILE COMMUNICATION DEVICES

(75) Inventor: Eero Kaappa, Tampere (FI)

(73) Assignee: Nokia Corporation, Espoo (FI)

(*) Notice: Subject to any disclaimer, the term of this patent is extended or adjusted under 35 U.S.C. 154(b) by 519 days.

(21) Appl. No.: 10/720,012

(22) Filed: Nov. 21, 2003

(65) Prior Publication Data
US 2004/0158583 A1  Aug. 12, 2004

(30) Foreign Application Priority Data
Nov. 21, 2002 (WO) .................. PCT/IB02/04857

(51) Int. Cl.
*G06F 17/00* (2006.01)
*G06F 15/173* (2006.01)

(52) U.S. Cl. .................. 707/104.1; 709/223

(58) Field of Classification Search ............ 707/104.1; 709/222–223
See application file for complete search history.

(56) References Cited

U.S. PATENT DOCUMENTS 6,105,062 A * 8/2000 Andrews et al. ............ 709/223

OTHER PUBLICATIONS

"SyncML Device Management Tree and Description," version 1.1, Feb. 15, 2002, 38 pp.*
Jonsson, Andreas and Novak, Lars, "SyncML—Getting the Mobile Internet in Sync," Ericsson Review No. 3, 2001, pp. 110-115.*
Jönsson, Andreas and Novak, Lars, "SyncML—Getting the Mobile Internet in Sync," Ericsson Review No. 3, 2001, pp. 110-115.

* cited by examiner

*Primary Examiner*—Don Wong
*Assistant Examiner*—Helene Rose
(74) *Attorney, Agent, or Firm*—Ware, Fressola, Van Der Sluys & Adolphson, LLP

(57) ABSTRACT

A method for defining description objects to be included into a hierarchical structured device description framework (DDF), where the DDF is constituted by a plurality of objects being hierarchically inter-associated to each other forming a kind of tree-like structure. The hierarchical structure is obtained by using different types of objects comprising at least: fixed parent object, run-time parent object, leaf object and link object. Each description object has one directly superordinate associated object, i.e. a parent object, whereas objects of the types fixed parent object and run-time parent object are allowed to have none, one or more objects being directly associated subordinate, i.e. child objects. At least one new object is defined to be associated to a parent object. If the parent object is a fixed parent object, the at least one new object is allowed to be a fixed object, run-time object, leaf object or link object.

18 Claims, 10 Drawing Sheets

| Illustrative Representation | Meaning |
|---|---|
| Fixed | Fixed Parent object: permanent node or dynamic node |
| Run-Time | Run-Time Object: dynamic node |
| Leaf | Leaf Object: management object without any child objects |
| Link | Link Object: pointing to another object |

Fig. 2a

| Character | Meaning |
|---|---|
|  | exactly one occurrences (none character) |
| + | one or may occurrences |
| * | zero or more occurrences |
| ? | zero or one occurrences |

Fig. 2b

```
001 : <?xml version="1.0" encoding="UTF-8"?>
002 : <!DOCTYPE MgmtTree SYSTEM "...syncml_dm_ddf.dtd">
003 : <MgmtTree>
004 :     <VerDTD>1.1</VerDTD>
005 :     <Man>--Nokia--</Man>
006 :     <Mod>--The device model--</Mod>
007 :     <Node>
008 :         <NodeName>AP</NodeName>
009 :         <Path>./</Path>
010 :         <DFProperties>
011 :             <AccessType> <Get/> </AccessType>
012 :             <Description>Access Point settings</Description>
013 :             <DFFormat> <node/> </DFFormat>
014 :             <Occurrence> <One/> </Occurrence>
015 :             <Scope> <Permanent/> </Scope>
016 :             <DFTitle>Access Point object</DFTitle>
017 :         </DFProperties>
018 :         <Node>
019 :             <NodeName/>
020 :             <DFProperties>
021 :                 <AccessType> <Add/> <Delete/> <Get/> <Replace/> </AccessType>
022 :                 <DFFormat> <node/> </DFFormat>
023 :                 <Occurrence> <ZeroOrMore/> </Occurrence>
024 :                 <Scope> <Dynamic/> </Scope>
025 :                 <DFTitle>"Name" of node $X_1$</DFTitle>
026 :             </DFProperties>
027 :             <Node>
028 :                 <NodeName>Px</NodeName>
029 :                 <DFProperties>
030 :                     <AccessType> <Get/> </AccessType>
031 :                     <DFFormat> <node/> </DFFormat>
032 :                     <Occurrence> <One/> </Occurrence>
033 :                     <Scope> <Dynamic/> </Scope>
034 :                     <DFTitle>All Proxy objects</DFTitle>
035 :                 </DFProperties>
036 :                 ...
037 :             </Node>
038 :             <Node>
039 :                 <NodeName>NAPDef</NodeName>
040 :                 <DFProperties>
041 :                     <AccessType> <Get/> </AccessType>
042 :                     <DFFormat> <node/> </DFFormat>
043 :                     <Occurrence> <ZeroOrOne/> </Occurrence>
044 :                     <Scope> <Dynamic/> </Scope>
045 :                     <DFTitle>All NAP Definition objects</DFTitle>
046 :                 </DFProperties>
047 :                 ...
048 :             </Node>
049 :             <Node>
050 :                 <NodeName>ClientID</NodeName>
051 :                 <DFProperties>
052 :                     <AccessType> <Add/> <Delete/> <Get/> <Replace/> </AccessType>
053 :                     <DFFormat> <chr/> </DFFormat>
054 :                     <Occurrence> <ZeroOrOne/> </Occurrence>
055 :                     <Scope> <Dynamic/> </Scope>
056 :                     <DFTitle>clients global identity</DFTitle>
057 :                     <DFType> <MIME>text/plain</MIME> </DFType>
058 :                 </DFProperties>
059 :             </Node>
060 :             <Node>
061 :                 <NodeName>BS</NodeName>
                      ...
113 :             </Node>
114 :         </Node>
115 :     </Node>
116 : </MgmtTree>
```

Fig. 5b

```
060 :        <Node>
061 :            <NodeName>BS</NodeName>
062 :            <DFProperties>
063 :                <AccessType> <Get/> </AccessType>
064 :                <DFFormat> <node/> </DFFormat>
065 :                <Occurrence> <ZeroOrOne/> </Occurrence>
066 :                <Scope> <Dynamic/> </Scope>
067 :                <DFTitle>All BootStrap objects</DFTitle>
068 :            </DFProperties>
069 :            <Node>
070 :                <NodeName/>
071 :                <DFProperties>
072 :                    <AccessType> <Add/> <Delete/> <Get/> <Replace/> </AccessType>
073 :                    <DFFormat> <node/> </DFFormat>
074 :                    <Occurrence> <ZeroOrMore/> </Occurrence>
075 :                    <Scope> <Dynamic/> </Scope>
076 :                    <DFTitle>"Name" of node $X_5$</DFTitle>
077 :                </DFProperties>
078 :                <Node>
079 :                    <NodeName>Name</NodeName>
080 :                    <DFProperties>
081 :                        <AccessType> <Add/> <Delete/> <Get/> <Replace/> </AccessType>
082 :                        <DFFormat> <chr/> </DFFormat>
083 :                        <Occurrence> <ZeroOrOne/> </Occurrence>
084 :                        <Scope> <Dynamic/> </Scope>
085 :                        <DFTitle>Displayable name</DFTitle>
086 :                        <DFType> <MIME>text/plain</MIME> </DFType>
087 :                    </DFProperties>
088 :                </Node>
089 :                <Node>
090 :                    <NodeName>Network</NodeName>
091 :                    <DFProperties>
092 :                        <AccessType> <Get/> </AccessType>
093 :                        <DFFormat> <node/> </DFFormat>
094 :                        <Occurrence> <ZeroOrOne/> </Occurrence>
095 :                        <Scope> <Dynamic/> </Scope>
096 :                        <DFTitle>All Network objects</DFTitle>
097 :                    </DFProperties>
098 :                    ...
099 :                </Node>
100 :                <Node>
101 :                    <NodeName>Country</NodeName>
102 :                    <DFProperties>
103 :                        <AccessType> <Add/> <Delete/> <Get/> <Replace/> </AccessType>
104 :                        <DFFormat> <chr/> </DFFormat>
105 :                        <Occurrence> <ZeroOrOne/> </Occurrence>
106 :                        <Scope> <Dynamic/> </Scope>
107 :                        <DFTitle>Country code for BS objects</DFTitle>
108 :                        <DFType> <MIME>text/plain</MIME> </DFType>
109 :                    </DFProperties>
110 :                </Node>
111 :                ...
112 :            </Node>
113 :        </Node>
```

Fig. 5c

METHOD AND DEVICE FOR DEFINING OBJECTS ALLOWING ESTABLISHMENT OF A DEVICE MANAGEMENT TREE FOR MOBILE COMMUNICATION DEVICES

CROSS REFERENCE TO RELATED APPLICATIONS

This application claims priority under 35 USC §119 to International Patent Application No. PCT/IB02/04857 filed on Nov. 21, 2002.

TECHNICAL FIELD

The present invention relates to a method and device for defining and handling of objects in a hierarchical object structure for establishing a device management tree structure for storing management related information of a mobile communication device. In particular, the present invention relates to a method for creating dynamic entities within the management tree allowing for establishing an overall hierarchical structure of the management tree having an efficient and preferable organization. Moreover, the present invention relates to devices being adapted to operate the aforementioned method.

BACKGROUND OF THE INVENTION

The synchronization of data is a well known problem for all users processing the same data with at least two different electronic devices. In general, synchronization takes place between a terminal device (e.g., a mobile phone) and a server device (e.g., an application in a local PC or a dedicated synchronization server). Data of portable terminals, such as portable computers, PDA terminals (personal digital assistant), mobile stations or pagers, can be synchronized with network applications, applications of desktop computers or with other databases of the telecommunications system, wherein the term database should be understood as broad as possible, i.e. shall cover arbitrary sets of data. In particular, data of calendar and e-mail applications are typically synchronized.

Synchronization has been based on the use of different manufacturer-specific protocols which are incompatible. This restricts the use of terminal or data types and often causes troubles to the user. In mobile communication, in particular, it is important that data can be retrieved and updated regardless of the terminal and application used.

To improve synchronization of application data, a language known as synchronization markup language SyncML, which is based on the extensible markup language (XML) and a corresponding standardized document type description (DTD), has been developed. By using a SyncML synchronization protocol, which employs messages in the SyncML format, data of any application can be synchronized between networked terminals and a network server of any kind. The SyncML synchronization protocol works both in wireless and in fixed networks and supports several transmission protocols.

The above presented SyncML synchronization technology addresses preferably the synchronization of databases. A problem similar to the synchronization of databases is given by the managing of configuration data properties necessary for the operation of electronic devices within changing environments, for example of mobile phone operating within mobile communication networks of different network carriers requiring individual carrier related sets of configurations e.g. network access point (NAP) definitions, proxy and gateway server addresses, information and definitions; address information of servers providing certain services such as short message service (SMS), multimedia message service (MMS) and the like. The SyncML device management relates to the harmonizing of configuration data. The respective configuration data or information is contained in management objects, respectively, associated to the device features and the applications, respectively.

SyncML device management (SyncML DM) protocol allows management commands to be executed on management objects and it uses a package format similar SyncML synchronization protocol and related definitions and is based also on XML. A management object might reflect a set of configuration parameters for a device, i.e. configuration parameters of device features and/or configuration parameters and settings of software applications executed on the device. Actions that can be taken against this object might include reading and setting parameter keys and values. Another management object might be the run-time environment for software applications on a device. Actions that can be taken against this type of object might include installing, upgrading, or uninstalling software elements. Preferably, dedicated management servers provide the required configuration parameters, settings, keys and values for synchronization of the device management information aforementioned.

The device management in accordance with the SyncML device management structures the management objects in a hierarchical management tree containing all information which can be managed using the SyncML DM protocol. The management tree is based on a permanent part of the management tree defined and provided by the manufacturer of the respective electronic device supporting SyncML device management. The real management tree present in such an operated electronic device is composed of this permanent part of the management tree which is expanded by a dynamically created part of the management tree. The real management tree is derived in some way from a kind of pre-determined tree framework, i.e. derived based on a kind of object-oriented inheritance, and results in a kind of interwoven management tree consisting of permanent and dynamic management objects.

It is obvious that the hierarchical structure of such a management tree containing management information required for operating a terminal device of a type as described above is rather complex depending on the functions provided by the terminal device to a user and the applications running on the terminal device and employing the management tree for configuration data and settings. Especially, each further function added to the terminal device or application implemented into the terminal device results in an increasing of the total hierarchical structure of the management tree causing a more complicated hierarchical structure. The kind and number of functions and/or applications for improving the operation of the terminal devices is unknown. But it is desired to maintain the introduced hierarchical management tree for storing and/or managing configuration data and settings even for future use.

SUMMARY OF THE INVENTION

An object of the invention is to provide a method for defining and creating at least one object of a hierarchical object structure comprising a plurality of objects, the hierarchical object structure allows derivation of a management tree of a terminal device such that the resulting management tree is structured as efficient as possible. An efficient structured management tree provides an efficient retrieval of one or more certain management objects for retrieving their contents. Moreover, an efficient structured management tree also takes the limited resources (memory, processing capability etc.) into consideration. The method for creating and handling a management tree is based on a couple of definition rules the consideration of which results in such an efficient and optimized structured management tree.

The objects of the invention are achieved with a method for defining at least one object to be included into a hierarchical object structure, corresponding device adapted to perform this method, computer programs and software tools which are disclosed in the independent claims. Preferred embodiments of the invention are disclosed in the dependent claims.

According to an embodiment of the invention, a method for defining at least one object to be included into a hierarchical object structure is described where the hierarchical object structure is constituted by a plurality of objects. The objects are hierarchically associated to each other. The hierarchical association of the objects is obtained by using different types of objects. The at least following object types of are available: fixed parent object type, run-time parent object type, leaf object type and link object type. Each object has one directly superordinate associated object which is denoted as parent object. Objects having fixed parent object and run-time parent object types are allowed to have none, one or more objects being directly associated subordinate thereto. The different types of objects allow the formation of a hierarchical object structure.

The at least one object is defined to be associated to a parent object which is directly associated superordinate thereto and is part of the hierarchical object structure. The object type of the parent object is checked. In case the parent object is a fixed parent object type, the at least one object is allowed to have a fixed parent object type, run-parent time object type, leaf object type or link object type. In case the parent object is a type run-time parent object type, the at least one object is allowed to have fixed parent object type, leaf object type or link object type. Further, properties of the at least one object are defined.

The hierarchical object structure being constituted by the plurality of objects is employed for generating at least a part of a hierarchical node structure being constituted by a plurality of nodes. The hierarchical node structure comprising the plurality of nodes is employed for distributing management related information among the plurality of nodes, wherein a certain part of the management related information is assigned to at least one of the plurality of nodes. The objects serve as template objects for deriving corresponding nodes and the hierarchical object structure serves as a template structure for deriving the corresponding hierarchical node structure.

According to an embodiment of the invention, it is further checked whether the parent object has already one or more subordinate associated objects, i.e. child objects. In case at least one of the one or more already existing objects is a run-time object type the defining of the at least one object is rejected.

According to an embodiment of the invention, it is checked whether the parent object is a fixed object type; whether the parent object has already one or more subordinate associated objects, i.e. child objects; and whether the at least one object has a fixed object type. In case the parent object has child objects and the parent object and the at least one new object have both fixed object types, the parent object and the at least one object are concentrated to a single new object having a fixed object type by replacing the parent object and the at least one object with the single object which has a fix object type.

According to an embodiment of the invention, at least a part of a description document is coded in accordance with the at least one object being defined at least the part of the description document being coded comprises information relating to the at least one object and the properties of the at least one object being defined previously. The coded description document allows obtaining a hierarchical node structure for storing the management related information of an electronic device being distributed among the plurality of nodes comprised in the hierarchical node structure. The obtaining may be performed by parsing the coded description document or one or more relevant part(s) thereof for deriving required nodes and their hierarchical inter-association with each other to establish/generate and to include/implement the hierarchical node structure or one or more part(s) of the hierarchical node structure, respectively.

According to an embodiment of the invention, the hierarchical object structure comprising the plurality of objects corresponds to a device description framework (DDF) information and the hierarchical node structure comprising the plurality of nodes corresponds to a management tree employed for device management of an electronic device. The device description framework (DDF) information and the management tree are provided and standardized by the SyncML Initiative in form of the synchronization markup language device management (SyncML DM) standard.

According to an embodiment of the invention, the description document corresponds to a device description framework (DDF) document. The DDF document is an extended markup language (XML) encoded document being encoded in accordance with a corresponding description framework document type description (DTD).

According to an embodiment of the invention, a software tool for defining at least one object to be included into a hierarchical object structure is provided. The software tool comprises program portions for carrying out the operations of the aforementioned methods when the software tool is implemented in a computer program and/or executed.

According to an embodiment of the invention, there is provided a computer program for defining at least one object to be included into a hierarchical object structure. The computer program comprises loadable program code portions for carrying out the operations of the aforementioned methods when the program is executed on a processing device, a computer or a network device.

According to an embodiment of the invention, a computer program product is provided which comprises program code portions stored on a computer readable medium for carrying out the aforementioned methods when said program product is executed on a processing device, a computer or network device.

According to an embodiment of the invention, a computer data signal is provided. The computer data signal is embodied in a carrier wave and represents a program or program code portions which, when executed by a processor, causes the aforementioned methods be carried out.

According to an embodiment of the invention, a processing device comprising a processing unit, a memory unit and a communication interface is provided. The processing unit is coupled to the memory unit and the communication unit allowing for exchanging data in-between them. The processing unit of the processing device is configured to allow for defining at least one object to be included into a hierarchical object structure. The hierarchical object structure is constituted by a plurality of objects. The objects are hierarchically associated to each other. The hierarchically association of the objects is obtained by using different types of object. The at least following object types of are available: fixed parent object type, run-time parent object type, leaf object type and link object type. Each object has one directly superordinate associated object being denoted as parent object. Objects of the fixed parent object and run-time parent object types are allowed to have none one or more objects being directly associated subordinate thereto. The different types of objects allow the formation of the hierarchical object structure.

At least one object is defined to be associated to a parent object which is directly associated superordinate to the parent object and is part of the hierarchical object structure. The object type of the parent object is checked. In case the parent object has a fixed parent object type, the at least one object is allowed to have a fixed object type, run-time object type, leaf object type or link object type. In case the parent object has run-time object type, the at least one object is allowed to have fixed object type, leaf object type or link object type. Further, properties of the at least one object are defined.

The hierarchical object structure being constituted by the plurality of objects is employed for generating at least a part of a hierarchical node structure being constituted by a plurality of nodes. The hierarchical node structure comprising the plurality of nodes is employed for distributing management related information among the plurality of nodes, wherein certain part of the management related information is assigned to at least one of the plurality of nodes. The objects serve as template objects for deriving corresponding nodes and the hierarchical object structure serving as a template structure for deriving the corresponding hierarchical node structure. The deriving of the nodes and the hierarchical node structure may be performed by processing unit.

According to an embodiment of the invention, a management system is provided which comprises a managed mobile communication enabled device, i.e. a client device, and a hierarchical object structure. The hierarchical object structure is constituted by a plurality of objects being hierarchically associated. Each object of the plurality of objects has a certain object type which is at least a fixed parent object type, a run-time parent object type, a leaf object type or a link object type. Further, each object has at least one directly superordinate arranged object. Moreover, each object which has the fixed parent object type or the run-time parent object type is allowed to have directly subordinate arranged objects.

In case a parent object which is directly arranged superordinate to one object and is part of the hierarchical object structure has the fixed parent object type, the one object has the fixed parent object type, the run-time parent object type, the leaf object type or the link object type. In case the parent object has the run-time parent object type, the one object has the fixed parent object type, the leaf object type or the link object type.

The hierarchical object structure being constituted by the plurality of objects describes and allows generation of a hierarchical node structure constituted by a plurality of nodes. The hierarchical node structure is employed for distributing management related information of the client device among the plurality of nodes, wherein certain parts of the management related information are assigned to at least one of the nodes.

The client device has at least a device management agent which generates at least a part of the hierarchical node structure from the hierarchical object structure to establish the part of the hierarchical node structure and to implement the part of the hierarchical node structure into the client device. The device management agent further distributes management related information among the plurality of nodes constituting the hierarchical node structure and retrieves at least parts of the management related information from one or more nodes of the plurality of nodes for configuring functions of the client device and/or applications running on the client device to be operable.

According to an embodiment of the invention, each object of the plurality of objects is only allowed to have one directly subordinate arranged object which has said run-time parent object type.

According to an embodiment of the invention, said hierarchical object structure has a concentrated object which has said fixed parent object type. The concentrated object is formed of a parent object and a child object, wherein the parent object is an object which is directly arranged superordinate to the child object. The concentrated object is formed in case the parent object has the fixed parent object type, the child object has the fixed parent object type and the child object is the only object which is directly arranged subordinate to the parent object.

According to an embodiment of the invention, a management system is provided which comprises a managed mobile communication enabled device, i.e. a client device, and a hierarchical node structure. The hierarchical node structure comprising the plurality of nodes is employed for distributing management related information of the client device among the plurality of nodes. Certain parts of the management related information are assigned to at least one node. Each node has a certain node type which is at least a fixed parent node type, a run-time parent node type, leaf node type and link node type. Each node has at least one superordinate arranged node and each node which has the fixed parent node type or the run-time parent object type is allowed to have subordinate arranged nodes.

In case a parent node which is directly arranged superordinate to one node and is part of said hierarchical node structure has the fixed parent node type, the one node has the fixed parent node type, the run-time parent node type, the leaf node type or the link node type. In case the parent node has the run-time parent node type, the one node has the fixed parent node type, the leaf node type or the link node type.

The client device has at least a device management agent which distributes management related information among the plurality of nodes constituting the hierarchical node structure and which retrieves at least parts of the management related information from one or more nodes of the plurality of nodes for configuring functions of said client device and/or applications running on said client device to be operable.

According to an embodiment of the invention, two or more child nodes which have the run-time parent node type and which have a same parent node have a common format. The parent node is directly superordinate arranged to these child nodes. The format of a node determines which kind of management related information are distributed among this node, i.e. node having the same format comprises management related information referring to the same device function and/or device application to be managed.

According to an embodiment of the invention, the hierarchical node structure has a concentrated node which has the fixed parent node type. The concentrated node is formed of a parent node and a child node, wherein the parent node is a node which is directly arranged superordinate to the child node. The concentrated node is formed in case that the parent node has the fixed parent node type, the child node has the fixed parent node type and the child node is the only node which is directly arranged subordinate to the parent node.

BRIEF DESCRIPTION OF THE DRAWINGS

The invention will be described in greater detail by means of embodiments with reference to the accompanying drawings, in which

FIG. 2a shows a table illustrating elements used for graphical notation of objects of the device description framework;

FIG. 2b shows a table illustrating special characters used additionally for graphical notation of objects of the device description framework;

FIG. 5b shows a first part of an excerpt of a DDF document corresponding to the graphical depiction shown in FIG. 5a and in accordance with an embodiment of the invention;

FIG. 5c shows a second part of the excerpt of the DDF document shown in FIG. 5b in accordance with an embodiment of the invention.

DETAILED DESCRIPTION

Figure 1A:
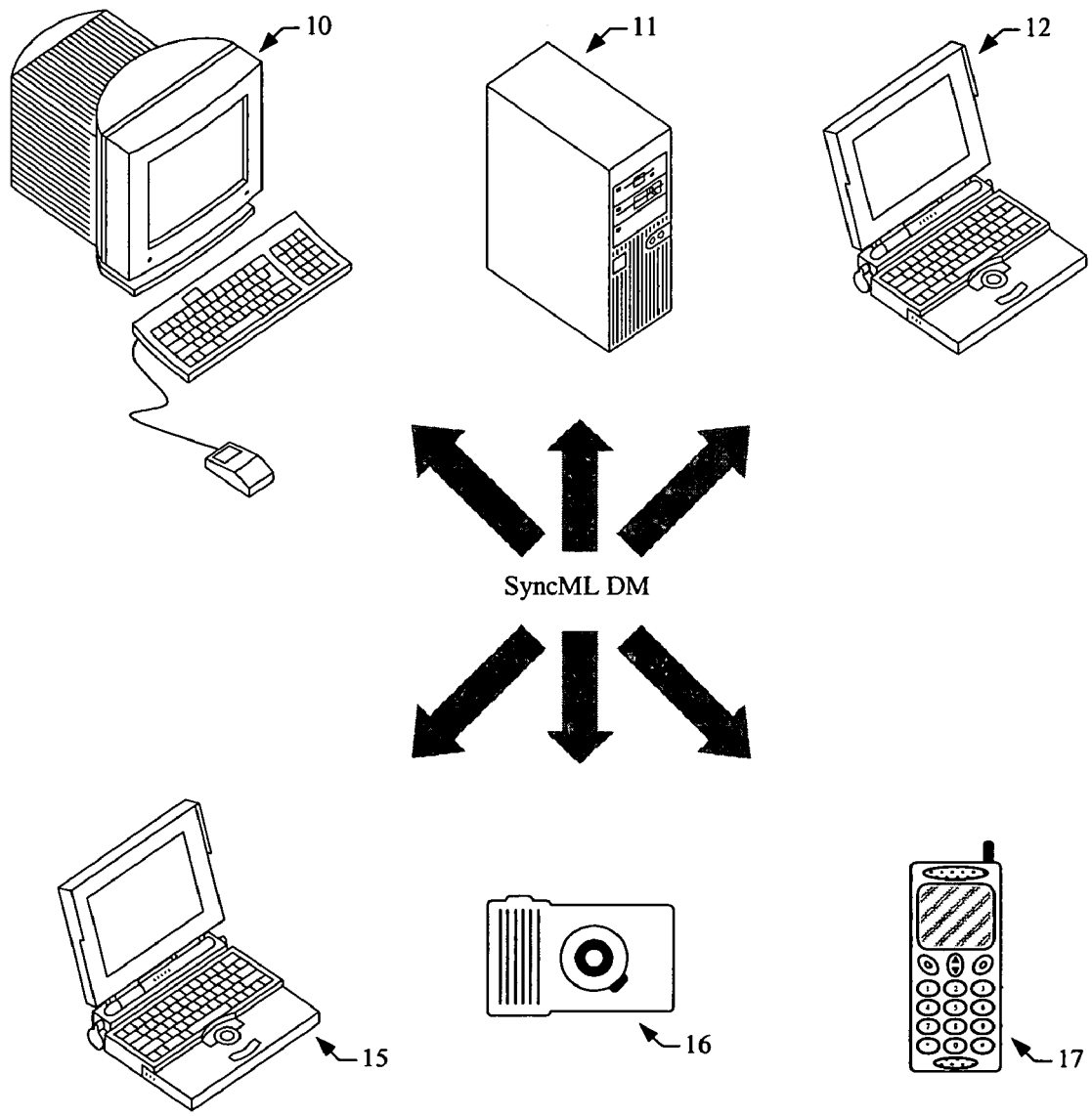
FIG. 1a shows a schematic diagram illustrating a set of exemplary electronic devices between which synchronization of information can be operated.

In the following, the embodiments of the invention will be described in a system supporting the SyncML device management standard or the related SyncML standard without limiting the invention thereto. Information about the SyncML standard and the SyncML device management standard can be obtained from the SyncML Initiative providing publicly the full standard documentation. Same or equal parts, features and/or operations shown in the figures will be referred to using the same reference numerals.

FIG. 1 shows a schematic diagram illustrating a set of exemplary electronic device between which synchronization of information can be operated. A certain database content of preferably mobile terminals shall be harmonized with database content provided by designated devices. Conventionally, mobile terminals act as synchronization clients harmonizing or synchronizing certain pre-defined data with the contents of a database or several databases provided by dedicated server devices. FIG. 1 illustrates a plurality of possible client devices and server devices for the synchronization operation. Typically, client devices are mobile stations like mobile phones 17 or personal digital assistants (PDA), mobile computers like notebooks 15, digital cameras 16 or personal computers (PC). Further, dedicated synchronization server devices may be desktop computers like a personal computer 10, a dedicated network server 11 or even a mobile computer like a notebook 12. It shall be noted that the client device functionality is not limited to mobile terminals as described above although the presented concept of synchronization is described in view of mobile terminals connected to dedicated serving devices.

A corresponding synchronization process in accordance with the SyncML protocol standard or the SyncML device management protocol standard, respectively, may be established via an appropriate logical communication connection. The logical communication connection may be provided by any communication networks in combination with transport protocols to which the synchronization protocol is adapted. A suitable communication network may be a local area network (LAN), a wide area network (WAN) which may comprise the internet and an intranet of a company but also wire-based serial networks such as universal serial bus (USB) or standardized serial communication (e.g. RS-232). The participating synchronization devices may be also connected via a wireless communication network such as a mobile network supporting global system for mobile communication (GSM) services and/or supporting general packet radio services (GPRS), a third generation mobile communication network such as a universal mobile telecommunication system (UMTS) network, a wireless local area network (WLAN), a Bluetooth network or an infrared network (IrDA). The logical communication connection between the participating synchronization devices may be provided by a single communication network of the aforementioned type but also may be provided by several communication networks of the aforementioned types interconnected by dedicated network routing devices.

With respect to the SyncML protocol standard the SyncML synchronization protocol and hence also with respect to the SyncML device management protocol standard the SyncML device management protocol can be implemented on the top of appropriate protocols in accordance with the type of employed communication network. Appropriate protocols on top of which the SyncML synchronization protocol may be implemented are the hyper text transfer protocol (HTTP), the wireless session protocol (WSP) of the wireless application protocol (WAP) standard, wireless datagram protocol (WDP), the object exchange protocol (OBEX) used for cable connections, such as universal serial bus (USB) or RS-232, for short-range radio frequency connections (Bluetooth) or for infrared connections (IrDA), the transport control protocol/internet protocol (TCP/IP) stack and on top of the transport layer service which is offered by the e-mail protocol (e.g. simple mail transfer protocol, SMTP).

Transfer at the lower layer can be performed according to the underlying network using e.g. short messages SMS (short message service) or other signaling type transmission methods (e.g. USSD; unstructured supplementary service data), circuit-switched data calls or packet-switched data transfer services.

Whereas the description above referred to a general synchronization and therefore also to the device management synchronization, the following description of the innovative concept will refer explicitly to the SyncML DM protocol.

The SyncML device management service itself is based on the exchange of a management document, which may be divided into a plurality massages or packages, respectively, comprising instructions in order to synchronize the device management data. SyncML DM Protocol consists of two parts: setup phase comprising authentication and device information exchange and management phase. Management phase can be repeated as many times as the server wishes.

Management phase consists of a number of protocol iterations, i.e. protocol iteration means a package from managed client device to management server and a package from management server to managed client device. Content of package sent from the management server to managed client device determines whether the session must be continued or not. If the management server sends management operations in packages that need responses (status or results) from the managed client device, the management phase of the protocol continues with new package from managed client device to management server containing client responses to management operations. Response package from managed client device starts new protocol iteration. The management server can send new management operation package and therefore initiate new protocol iteration as many times as it wishes.

An exemplary and valid total sequence of packages in accordance with the setup phase and the management phase is described in the following section in order to provide a coarse overview of the package exchange.

Package 0—initiation of the management session: Most managed client devices can receive unsolicited messages, sometimes called "notifications". A management server can use this notification capability to cause the client to initiate a connection back to the management server several bearers can be used for transmitting management initiation notifications. Note that an identical effect to receiving a management initiation notification can be caused in other ways.

Package 1—initialization from managed client device to management server: The purpose of the initialization package sent by the managed client device is:
to send managed client device information (like manufacturer, model etc) to a device management server,
to identify the managed client device to the management server,
to inform the server whether the management session was initiated by the server (by sending a trigger in Package 0) or by the client (like end user selecting a menu item).

Package 2—initialization from management server to managed client device: The purpose of the initialization package sent by the management server is:
to identify the device management server to the managed client device,
to send optionally management commands and management data to the managed client device,
to send optionally further commands like user interaction commands.

Packages 1 and 2 are part of the setup phase of the management process. Following packages 3 and 4 are part of the management phase of the management session.

Package 3—managed client device response to management server: The purpose of this management package is:
to transmit results of the management commands sent from the management server to the managed client,
to transmit results of optional user interaction commands.

Package 4—further management server operations: The purpose of this management package is:
to transmit any further necessary management operations or commands from the management server to the managed client, respectively, or
to close the management session.

A package 4 containing further management operations causes a response of the managed client device in kind of a package 3. Hence, the management session can comprise an arbitrary number of iterations of the packages 3 and 4.

The aforementioned SyncML device management service being based on management message exchanges in accordance with the above described phases and packages, respectively, takes actions against entities of the management tree structuring and containing information to be managed, respectively. The management tree is a well-defined hierarchical structured arrangement of all available and used management entities, wherein the position and the addressing of certain information contained in a certain management entity reflects the propose of the management information contained, respectively. This well-defined hierarchical structure is referred to as management tree. The hierarchical organization of the management entities primarily addresses the need for providing an adequate and unique addressing scheme for each single management entity corresponding to the hierarchical structured arrangement. A superordinate entity, the root entity, provides the origin of a hierarchically arranged management entities, i.e. the root entity of the management tree relative to which the management entities are arranged.

Different kind of management entities are distinguished. The management tree comprises interior nodes, in the following also simply denoted as nodes, leaf nodes, in the following also simply denoted as leafs and link nodes, in the following also simply denoted as links. A node represents an entity used for associating several dependent entities thereto, i.e. represents a hierarchical entity having some but in a manner predetermined number of directly (immediately) associated child entities being hierarchically arranged subordinate. Each node itself is associated to a superordinate node (interior node) or the root node. Based on this inter-concatenation the management tree is set up. The (interior) nodes are further distinguished into permanent (interior) nodes and into dynamic (interior) nodes. As the naming "permanent" indicates permanent nodes are always present in the management tree independently from any operational state of the managed client device or application(s) running, whereas the dynamic nodes may be added and/or deleted by the managed client device or the management server corresponding on the need of information being contained in the hierarchical structure (dynamic part of the management tree) being associated with such a dynamic node.

A leaf is associated to a superordinate (interior) node but provides no association of subordinate entities, i.e. have no associated child node(s). Instead leafs are employed as container for including certain content of any but predefined type, i.e. may include a certain content, value(s) etc. such like integer values, larger values (plain text, array of values), complex data types, pictures and program code. The leafs include the configuration data and/or settings required for device and/or application operation. Leafs represent the "end"-entities of the management tree, i.e. the lowest hierarchical level of the respective branches of the management tree.

Figure 1B:
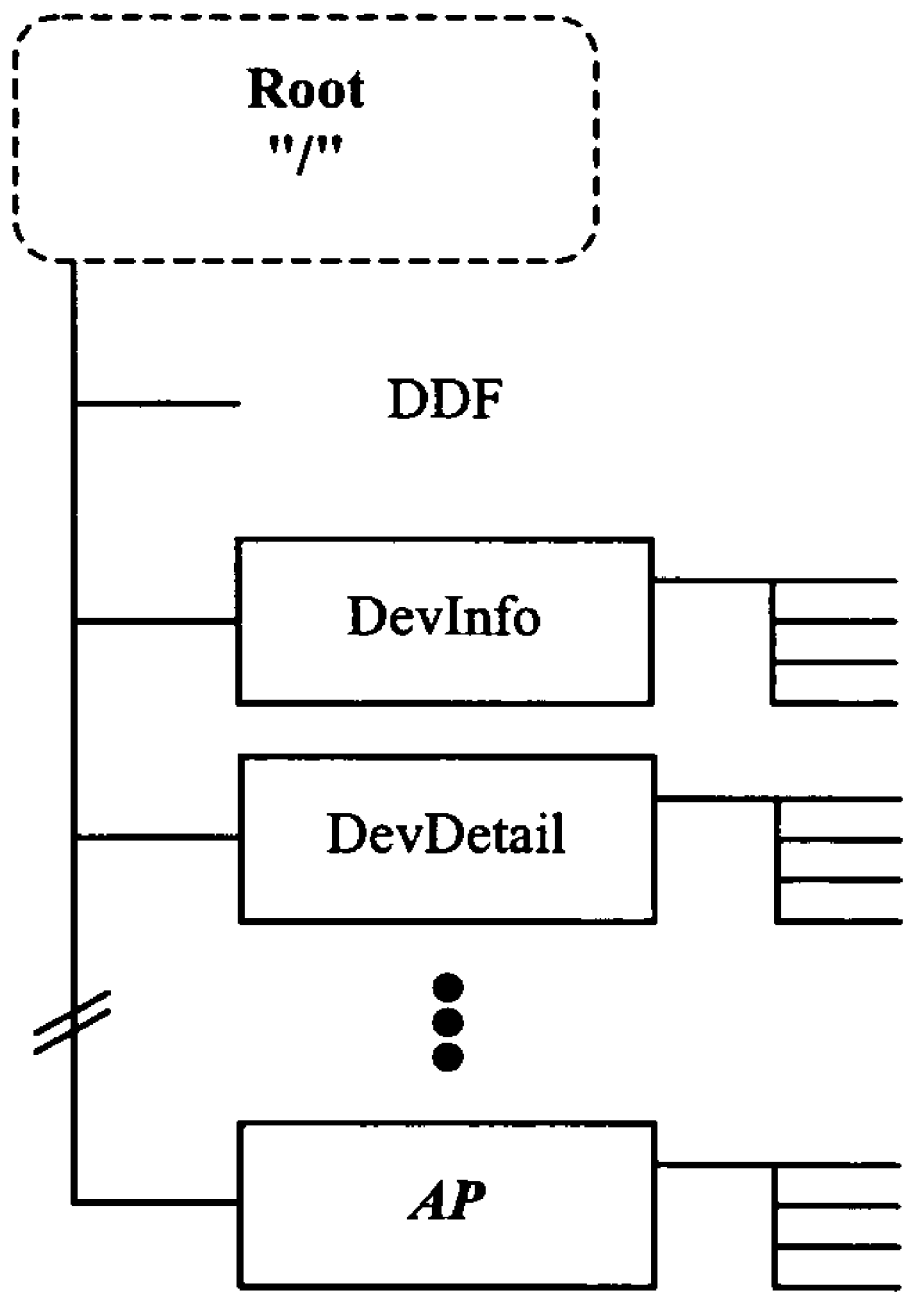
FIG. 1b shows an example overall part of a management tree.

FIG. 1b shows an example part of a management tree such as implemented in a managed client device. The example part of the management tree comprise the root node "/" emerging from which the management tree is set up, i.e. the depiction of the example part of the management tree is limited to highest level structure. Subordinate to the root node, there are depicted a device description framework (DDF) node, a device information (DevInfo) node, a device detail information (DevDetail) node and an example node AP. The number of nodes associated to the root node "/" is not limited to the depicted ones, these are just for example illustration, i.e. non, one or more additional nodes may be associated subordinate to the root node "/". The nodes DDF, DevInfo and DevDetail represent a selection of mandatory nodes (but not limiting thereto) for managed client device allowing to operate with SyncML device management service. The DevDetail node and the DevDetail node are interior nodes which means that an unlimited number of further nodes, links and leafs are arranged subordinate thereto. The management tree is set up at a switching on of the managed device clients. Adaptations and/or modifications of the management tree are operated in accordance with the above described exchange of management information corresponding to the SyncML device management service.

Each node and hence each information contained in a certain node is addressable. The addressing of a certain node is based on instance identifier being assigned to each node of the management tree. At assigning instance identifiers to nodes it is to be considered that the addressing of each node has to be unique. That means, an interior node may have one or more directly associated subordinate nodes (interior nodes, leaf nodes, link nodes). In order to obtain a unique addressing for each node within the management tree the instance identifiers of these directly associated subordinate nodes have to differ to each other. An address information comprises all instance identifiers originating from the root node to the node to be addressed, which are passed by following the hierarchical structure of management tree.

The concept of the management tree is provided to a broad number of managed client devices implementing different functions and/or to a managed client devices operation a board number of different application which are not identical, which means that the managed client device are not describable with the same structure of the management tree and consequently the behavior of the managed client devices in view of the SyncML device management service differ.

This problem is addressed by the device description framework (DDF). The usage of the device description framework (DDF) allows a manufacturer of a managed client device for providing information describing the management tree in all its different dynamic (run-time) representations such that the managed client device is capable to be managed by a management server being based on the SyncML device management service. The device description framework (DDF) should be embodied in such a way that it is applicable in a flexible and easily expandable way and also covers future demands to the management tree. The device description framework (DDF) is an abstract description being based on entities denoted as objects or description objects from which the nodes of a management tree are derivable and obtainable, respectively. Consequently the management tree itself is derivable from the device description framework (DDF) wherein the device description framework (DDF) allows for deriving a broad number of individual management tree structures all valid for use with the corresponding managed client device and adapted to different situations. Therefore, the device description framework (DDF) comprises description objects allowing for deriving nodes (permanent/dynamic interior nodes, leaf nodes and link nodes), their properties and their concatenation (association, arrangement within the management tree). The description objects of the device description framework (DDF) include therefore definitions describing in detail information required for setting up the nodes and consequently the management tree, respectively, in a valid manner. The deriving of nodes from description objects is based on a kind of heredity procedure. The description objects of the device description framework (DDF) are also arranged in a hierarchical structure acting as a template hierarchical structure of a resulting derived management tree.

The inventive concept of the present invention relates to rules which are to be applied to the device description framework (DDF) during defining/creating of description objects such that the above mentioned proclaimed advantages are achieved.

The description of the device description framework (DDF) will be given in reference to graphical depictions of the device description framework (DDF) allowing for giving an overview to the description objects and allowing to perceive resulting possible and valid management tree(s).

FIG. 2a shows a table illustrating elements used for graphical notation of objects of the device description framework. The illustrative representation is compared with the meaning and the description object, respectively. Corresponding to the nodes available for forming a management tree, the table comprises a fixed parent object, a run-time (parent) object, a leaf object and a link object. The fixed parent object is represented by a rectangular containing a title herein replaced with the word "Fixed", the run-time object is represented by a rectangular having rounded corners and containing a title herein replaced with the word "Run-Time", the leaf object is represented simply by its title herein replaced with the word "Leaf" and finally the link object is represented simply by its title being bold styled and underlined, herein replaced with the word "Link".

The title of the description object is one property element of the description objects. A description object is uniquely identifiable by its NodeName element representing and indicating a name of a certain type definition. Whereas the title of a description object may be variable (under certain circumstances as illustrated below), the name of the description object is always fixed. Further property elements must or may be contained: AccessType, DefaultValue, Description, DFFormat, Occurrence, Scope, DFTitle and DFType. The presented list of property elements is just for example and it is to be understood as not limiting thereto. The AccessType element specifies which commands are allowed on the node and must be defined. Possible specifications for the AccessType element are Get, Delete, Add and Replace. The DefaultValue element defines optionally the node value to be used in a device unless the node value is not specifically set to a different value. The Description element defines an optional human readable description of the node.

The DFFormat element defines a mandatory data format of the described node. The Occurrence element specifies optionally the number of instances that may occur of that node in the management tree. The Scope element specifies optionally whether this object describes a permanent or dynamic node. The DFTitle element defines an optional human readable name of the node. The DFType element defines for leaf nodes the MIME type of the node value and for interior nodes null or a DDF document name.

The fixed parent object represents a permanent or a dynamic interior node. The title of the parent object is fixed and used as instance identifier in the management tree. The Occurrence of the fixed parent object may be one (One), the corresponding interior node is a permanent interior node, i.e. the Scope is permanent, whereas in case the Occurrence of the fixed parent object is none or one (ZeroOrOne) the Scope of the fixed parent object is dynamic such that a corresponding interior node can be created and deleted at run-time by a management server.

The run-time (parent) object represents a dynamic interior node. The title of the run-time object is not fixed, i.e. the name of a dynamic interior node created in correspondence to the run-time object (e.g. by the management server) is pretended dynamically during its creation and is used as instance identifier in the management tree. The dynamically pretended instance identifier may comprise any sequence of alphanumeric characters (max. 9 characters). In the following the title of a run-time object will be represented by <X> or <Y>.

The leaf object represents a leaf node. The link object represents a link node. Leaf nodes and link nodes are created in accordance with the leaf object and the link object, respectively. The titles of the leaf object and the link object are fixed, respectively. The leaf object must define the content type of the corresponding leaf node, i.e. its MIME type, whereas the link object defines a content type of the corresponding leaf node for coding an address information, for example a URI (uniform resource indicator)

FIG. 2b shows a table illustrating special characters used additionally for graphical notation of objects of the device description framework. The table compares characters and their meanings. The characters represent the Occurrence property element of a description object. The Occurrence element specifies optionally the number of instances that may occur of that node in the management tree. By default and in case no additional character is appended to the title of the description object the occurrence of the corresponding node in the management tree is exactly one. The "+" sign appended to the title of the description object indicates that the occurrence of the corresponding node in the management tree is once or may be also more times than one (Occurrence: OneOrMore, OneOrN). The "*" sign appended to the title of the description object indicates that the occurrence of the corresponding node in the management tree is none or may be also more times than none (Occurrence: ZeroORMore, ZeroOrN). The "?" sign appended to the title of the description object indicates that the occurrence of the corresponding node in the management tree is none or once (Occurrence: ZeroOrOne).

The following FIG. 3a to FIG. 3e illustrate rules to be applied and to be observed during the generation of the device description framework of a certain managed client device according to embodiments of the invention.

Figure 3A:
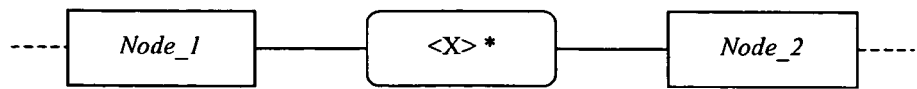
FIG. 3a shows a first arrangement of description objects according to an embodiment of the invention.

FIG. 3a shows a first arrangement of description objects according to an embodiment of the invention. This first arrangement includes a first fixed parent object "Node_1", a run-time object <X>* and a second fixed parent object "Node_2". The run-time object <X>* is associated subordinate to the first fixed parent object "Node_1", whereas the second fixed parent object "Node_2" is associated subordinate to the run-time object <X>*. Basing on the above described device description framework (DDF) structure and on the graphical definition of description objects, a resulting part of a management tree comprises an interior node corresponding to the first fixed parent object "Node_1" and having the instance identifier "Node_1" and none or an unlimited number of interior nodes corresponding to the run-time object <X>*. The instance identifier(s) of these interior nodes are pretended at run-time and may be for example "run-time_1", "run-time_2" and so on.

It may be assumed that one interior nodes with the instance identifier "run-time_1" has been created. The interior node "run-time_1" is associated subordinate to the interior node "Node_1", i.e. the interior node "run-time_1" is a child node of the interior parent node "Node_1". In accordance with the scope definition (Scope element) of the second fixed parent object "Node_2", the interior node "run-time_1" may be a parent node to the interior child node "Node_2" corresponding to the second fixed parent object "Node_2".

It may be assumed that two interior nodes with the instance identifiers "run-time_1" and "run-time_2" has been created. The interior nodes "run-time_1" and "run-time_2" are equal child nodes to the interior parent node "Node_1". And in accordance with the scope definition (Scope element) of the second fixed parent object "Node_2", the interior node "run-time_1" may be a parent node to the interior child node "Node_2" corresponding to the second fixed parent object "Node_2" and in parallel the interior node "run-time_2" may analogously be a parent node to the interior child node "Node_2" corresponding to the second fixed parent object "Node_2". The both interior child node "Node_2" are distinguishable via their different dependencies (association) within the management tree.

Figure 3B:
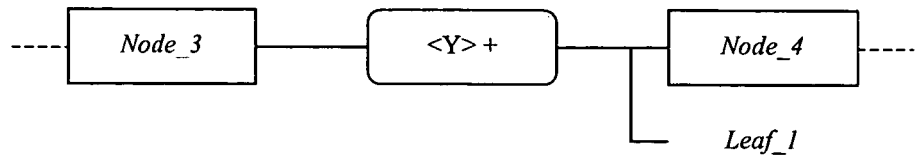
FIG. 3b shows a second arrangement of description objects according to an embodiment of the invention.

FIG. 3b shows a second arrangement of description objects according to an embodiment of the invention. This second arrangement includes a first fixed parent object "Node_3", a run-time object <Y>+, a second fixed parent object "Node_4" and a leaf object "Leaf". The run-time object <Y>+ is associated subordinate to the first fixed parent object "Node_3", whereas the second fixed parent object "Node_4" and the leaf object "Leaf_1" is associated subordinate to the run-time object <Y>+.

Basing on the above described device description framework (DDF) structure, a resulting part of a management tree comprises an interior node corresponding to the first fixed parent object "Node_3" and having the instance identifier "Node_3" and at least one or more interior nodes corresponding to the run-time object <Y>+, being directly associated subordinate to the interior parent node "Node_3", i.e. being equal child nodes of the interior parent node "Node_3". The instance identifier(s) of these interior child nodes are pretended at run-time and may be referred as for example "run-time_1", "run-time_2" and so on. Each of the interior nodes "run-time_1", "run-time_2", . . . have two child nodes, an interior child node "Node_4" corresponding to the second fixed parent object "Node_4" and a leaf child node "Leaf_1" corresponding to the leaf object "Leaf_1".

The structures described with respect to FIG. 3a and FIG. 3b represent device description framework (DDF) definition structure allowed for use. Contrary thereto, FIG. 3c shows arrangements of description objects to be avoid according to an embodiment of the invention.

The first arrangement of description objects exhibits a first run-time object <X>* and a second run-time object <X>* being associated subordinate to the first run-time object <X>*. The second arrangement of description objects exhibits a first run-time object <X>* and a second run-time object <Y>+ being associated subordinate to the first run-time object <X>*. The point in common of both arrangements is that two run-time objects are arranged direct consecutively. Arrangements comprising direct consecutive run-time objects are to be avoid in the device description framework (DDF) of a managed client device.

Figure 3C:
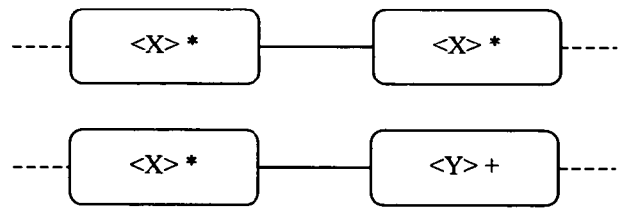
FIG. 3c shows arrangements of description objects to be avoid according to an embodiment of the invention.

It is obviously from the aforementioned description of deriving management tree structures that the possible resulting management tree structures in accordance with the first arrangement and second arrangement of description objects shown in FIG. 3c arise in complex and hard to manage management tree structures. Due to the fact that a management tree shall be future proof and as easy as possible to avoid inconsistencies such arrangements have to be avoid, i.e. should be forbidden to be used.

As an overall rule for defining description objects, a run-time object has to be associated subordinate to a fixed parent object and further this run-time object has to act as a parent object to at least one associated subordinate fixed parent object and/or a leaf object and/or a link object.

Figure 3D:
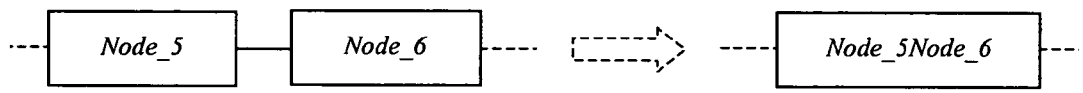
FIG. 3d shows an arrangement of description objects to be concentrated to a single description object according to an embodiment of the invention.

FIG. 3d shows an arrangement of description objects to be concentrated to a single description object according to an embodiment of the invention. The arrangement comprises two consecutive fixed parent objects, a fixed parent object "Node__5" and a fixed parent object "Node__6", wherein the only child object of the fixed parent object "Node__5" is the fixed parent object "Node__6". The stringing together of fixed parent objects in the described kind do not exhibit any useful information such that both the fixed parent object "Node__5" and a fixed parent object "Node__6" may be concentrated to a single fixed parent object "Node__5Node__6" which exhibits the same information. The concentration simplifies a resulting management tree in view of exploring the management tree and accessing node arranged subordinate to the concentrated fixed parent object "Node__5Node__6" by simplifying e.g. their addressing.

Figure 3E:
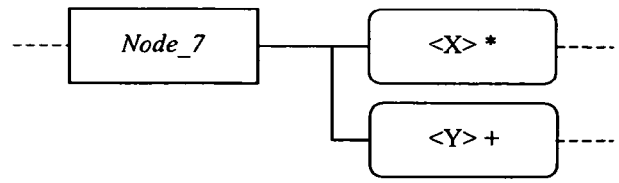
FIG. 3e shows an arrangement of description objects to be avoid according to an embodiment of the invention.

FIG. 3e shows an arrangement of description objects to be avoid according to an embodiment of the invention. The arrangement comprises a fixed parent node "Node__7" having associated directly to child objects, a first run-time object <X>* and a second run-time object <Y>+. The first run-time object <X>* and a second run-time object <Y>+ each related to a different type of interior node to be derived in accordance with the definition represented by the depicted first run-time object <X>* and second run-time object <Y>+. The first run-time object <X>* and the second run-time object <Y>+ may further relate to different functions and applications of the managed client device, respectively. In order to obtain a manageable and clear management tree different type of run-time objects should not be associated subordinate to a common fixed parent object such as shown in FIG. 3e. Rather, run-time objects of different type relating to different functions and applications of the managed client device, respectively, are to be associated to different fixed parent objects to provide a clearly systematic, useable and manageable management tree.

Figure 4A:
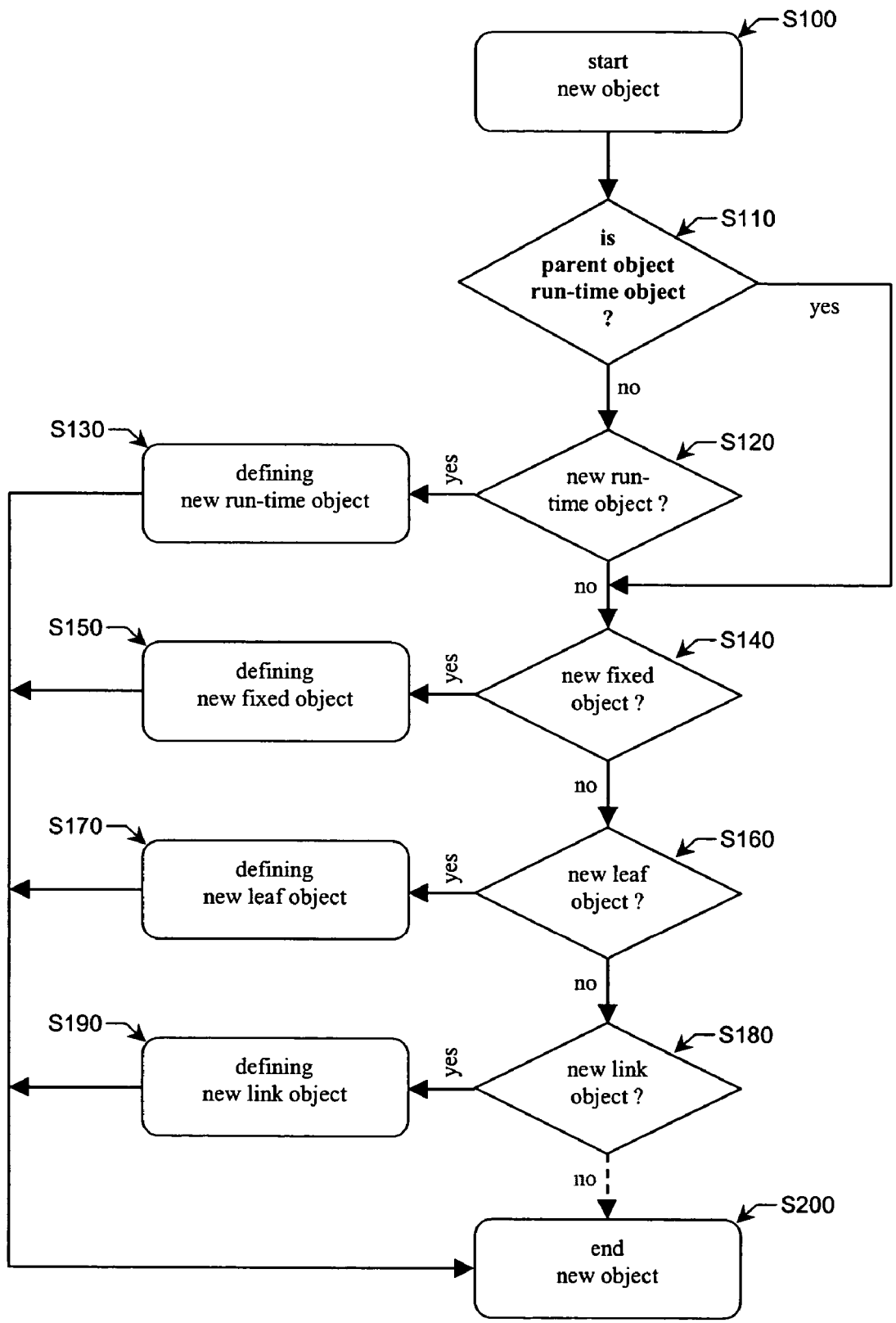
FIG. 4a shows a first flow chart illustrating the defining of a description object in accordance with an embodiment of the invention.

FIG. 4a shows a first flow chart illustrating the defining of a description object in accordance with an embodiment of the invention. The illustrated first flow chart represents an example embodiment taking into account the above illustrated and described rules and regulations, respectively, for defining description objects and their dependencies.

In an operation S100, the operational sequence according to an embodiment of the present invention for creating/defining a new description object is started.

In an operation S110, the object type of the parent object is determined. The parent object to a new description object can be a fixed parent object or a run-time (parent) object. In accordance to the rule and regulation described with reference to FIG. 3c, it is to be avoid that two run-time objects are arranged consecutive in the device document framework (DDF). Correspondingly, it is checked whether the parent object is a run-time (parent) object or a fixed parent object. In case the parent object is of a run-time type the operational sequence of the depicted operational sequence is continued with operation S140, ensuring that no consecutive run-time object is defined. In case the parent object is of a fixed type the operational sequence of the depicted operational sequence is continued with operation S120 allowing for associating any type of description object to the fixed parent object.

In an operation S120, it is checked whether a new run-time object is to be defined and in case it is the operational sequence continues with operation S130. Otherwise the operational sequence continues with operation S140.

In an operation S130, the new run-time object is defined. The defining involves an associating of the new run-time object to the superordinate arranged parent object. In correspondence with the above described rules and regulations the superordinate arranged parent object is a fixed parent object. The defining of the new run-time object further may include the defining of further property elements comprising AccessType, DefaultValue, Description, DFFormat, Occurrence, Scope, DFTitle and DFType which allow and control the generation of nodes based on description object. After a complete defining of all necessary and required property elements of the new run-time object the operational sequence for defining a new description object is continued with operation S200, where the operational sequence ends. Further new description objects may be defined by starting again the described operational sequence.

In an operation S140, it is checked whether a new fixed parent object is to be defined and in case it is the operational sequence continues with operation S150. Otherwise the operational sequence continues with operation S160.

In an operation S150, the new fixed parent object is defined. The defining involves an associating of the new fixed parent object to the superordinate arranged parent object. In correspondence with the above described rules and regulations the superordinate arranged parent object is either a fixed parent object or a run-time (parent) object. The defining of the new fixed parent object further may include the defining of further property elements comprising AccessType, DefaultValue, Description, DFFormat, Occurrence, Scope, DFTitle and DFType which allow and control the generation of nodes based on description object. After a complete defining of all necessary and required property elements of the new fixed parent object the operational sequence for defining a new description object is continued with operation S200, where the operational sequence ends. Further new description objects may be defined by starting again the described operational sequence.

In an operation S160, it is checked whether a new leaf object is to be defined and in case it is the operational sequence continues with operation S170. Otherwise the operational sequence continues with operation S180.

In an operation S170, the new leaf object is defined. The defining involves an associating of the new leaf object to the superordinate arranged parent object. In correspondence with the above described rules and regulations the superordinate arranged parent object is either a fixed parent object or a run-time (parent) object. The defining of the new leaf object further may include the defining of further property elements comprising AccessType, DefaultValue, Description, DFFormat, Occurrence, Scope, DFTitle and DFType which allow and control the generation of nodes based on description object. After a complete defining of all necessary and required property elements of the new leaf object the operational sequence for defining a new description object is continued with operation S200, where the operational sequence ends. Further new description objects may be defined by starting again the described operational sequence.

In an operation S180, it is checked whether a new link object is to be defined and in case it is the operational sequence continues with operation S180. In the present invention four different types of description objects are presented. Correspondingly, the checking operations S120, S140, S160 and S180 cover this four types. It should be noted that one or more further types of description objects may be included into the device document framework (DDF). In accordance with the current situation in case new link object is not to be defined the operational sequence is continued with operation S200, i.e. the operational sequence ends without any new description object definition. The operations of checking and defining for one or more further types of description objects may be implemented in the present operational sequence analogously to the checking and defining operations described above with reference to the respective types of description objects.

In an operation S190, the new link object is defined. The defining involves an associating of the new link object to the superordinate arranged parent object. In correspondence with the above described rules and regulations the superordinate arranged parent object is either a fixed parent object or a run-time (parent) object. The defining of the new link object further may include the defining of further property elements comprising AccessType, DefaultValue, Description, DFFormat, Occurrence, Scope, DFTitle and DFType which allow and control the generation of nodes based on description object. After a complete defining of all necessary and required property elements of the new link object the operational sequence for defining a new description object is continued with operation S200, where the operational sequence ends. Further new description objects may be defined by starting again the described operational sequence.

In an operation S200, the operational sequence according to an embodiment of the present invention for creating/defining a new description object is finished.

According to a further (improved) embodiment of the invention, the operational sequence also takes into account a checking of the types of description objects being already associated to the parent object to which the new description object is to be directly associated as an additional client object. The corresponding rule and regulation is described in detail with reference to FIG. 3e, respectively.

In the operation S130, the existing "parallel" description child objects of the parent object are determined. In case there are existing description child objects, it is to be avoid that run-time objects of different types are associated to the same parent object. In case a run-time object of different type is to be defined to be associated in parallel to an existing run-time object having a certain type the defining rejected and the operational sequence is continued with operation S200, i.e. the operational sequence ends.

According to a further (improved) embodiment of the invention, the operational sequence also takes into account a checking of the types of description objects being already associated to the parent object to which the new description object is to be directly associated as an additional client object. The corresponding rule and regulation is described in detail with reference to FIG. 3d, respectively.

In the operation S150, the existing "parallel" description child objects of the parent object are determined. In case no "parallel" description child objects exists, no "parallel" description child objects will be defined and the parent object is a fixed parent object, the new fixed parent object and the existing superordinate associated fixed parent object are concentrated to a single fixed parent object in order to simplify the structure of the device description framework (DDF) and consequently the management tree, respectively.

Figure 4B:
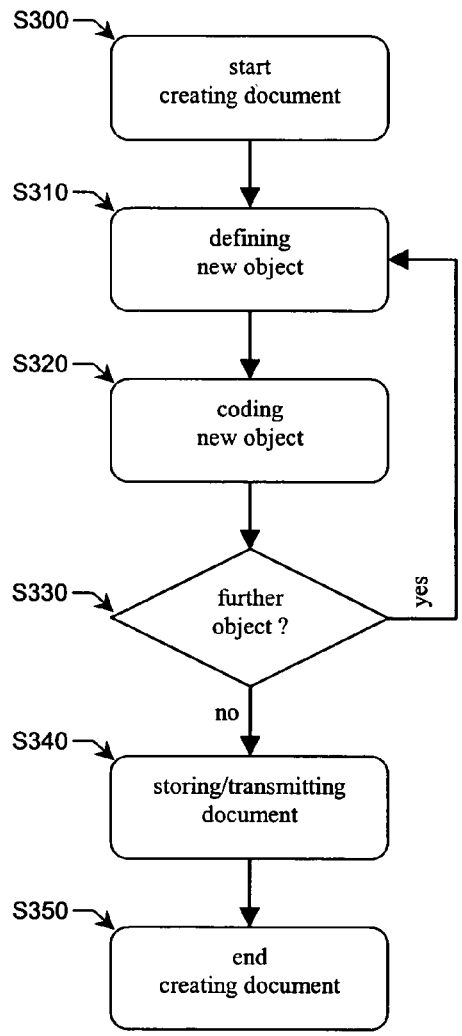
FIG. 4b shows a second flow chart illustrating a defining and creating, respectively, of at least a part of a DDF document in accordance with an embodiment of the invention.

FIG. 4b shows a second flow chart illustrating a defining and creating, respectively, of at least a part of a device description framework (DDF) and DDF document in accordance with an embodiment of the invention. This operational sequence involves the operational sequence depicted in FIG. 4a according to an embodiment of the present invention.

In an operation S300, the operational sequence for creating a DDF document in accordance with the defining of new objects according to an embodiment of the invention is started.

In an operation S310, a description object is defined. By default, the root object is existent, i.e. being the basis relative to which the device description framework (DDF) is structured and consequently the DDF document is built-up. The defining of a description object in the operation S310 comprises the operations depicted in FIG. 4a and described in detail with reference thereto.

In an operation S320, the resulting defined new object is coded in the DDF document in accordance with the definitions having been performed in the operation S310.

In an operation S330, in case a further new description object is to be added to the current device description framework and the DDF document, respectively, the operational sequence returns to the operation S310. Otherwise in case the current device description framework and the DDF document is complete, respectively, i.e. no further object is to be added thereto, the operational sequence continues with operation S340.

In an operation S340, the resulting device description framework and DDF document is stored in or may be transmitted to a management server and/or a managed client device, respectively, to be applied for establishing, generating, modifying etc. of a management tree. Moreover, the resulting device description framework and DDF document is processed for generating at least a part of a management tree, respectively. Such a processing of a device description framework and DDF document will be described below with reference to FIG. 4c, respectively.

In an operation S350, the operational sequence for creating a DDF document in accordance with the defining of new objects according to an embodiment of the invention is finished.

It shall be noted, that the operation S310 of defining a new description object and the operation S320 of coding the new description object has been described as separated operations. It is to be understood, that both the operation S310 and the operation S320 may be embodied as a comprehensive operation, such that the defining and coding are operated simultaneously.

Figure 4C:
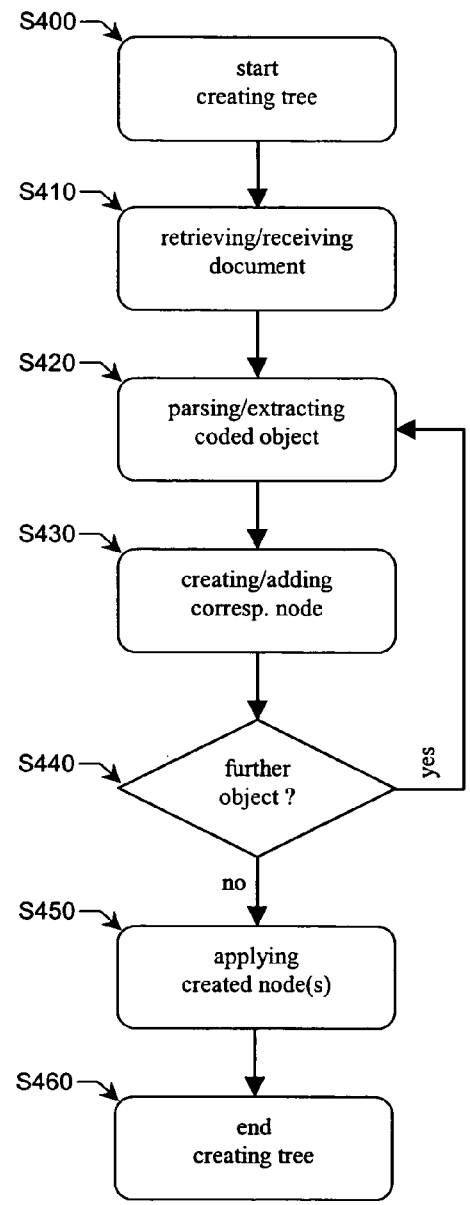
FIG. 4c shows a third flow chart illustrating the parsing and generating of at least a part of a management tree being based on a DDF document in accordance with an embodiment of the invention.

FIG. 4c shows a third flow chart illustrating the parsing and generating of at least a part of a management tree being based on a device description framework (DDF) and a DDF document, respectively, in accordance with an embodiment of the invention.

In an operation S400, the operational sequence for creating/generating at least a pert of a management tree being based on a device description framework (DDF) and a DDF document according to an embodiment of the invention is started, respectively.

In an operation S410, the device description framework (DDF) and the DDF document comprising the coded description objects in correspondence to which nodes of a management tree are to be generated is retrieved from a storage or may be received from a providing device entity. For example, a device description framework (DDF) and a DDF document may be received by a managed client device from a management server or may be received by a management server from a DDF providing networked server. As aforementioned, the availability of the device description framework (DDF) and the DDF document, respectively, allows a processing device to generate valid and appropriate management tree structures and guaranties their applicability.

In an operation S420, the device description framework (DDF) and the DDF document, respectively, is parsed. The parsing may comprise an extracting of information and/or an interpreting of the information obtained by parsing. The parsing may be operated object by object as embodied herein or may be operated block-wise, i.e. may be operated by parsing a set of related description objects. The parsing of the device description framework (DDF) and the DDF document may further comprise an identifying operation, respectively, in order to parse/extract the required description object(s) from the total device description framework (DDF) and the DDF document, respectively.

In an operation S430, basing on the information obtained by operation S420, a node or several nodes are generated. The generating of each node is performed in correspondence with the description object comprised in the device description framework (DDF) and the DDF document, respectively. The generated node is included in the at least part of the management tree to be generated. The including of the new node is performed under consideration of the hierarchical association defined in the device description framework (DDF) and the DDF document, respectively, in order to generate the at least part of a management tree with the correct hierarchical structure.

If necessary, in the operation S430 one or more values are further assigns to the new generated node(s).

In an operation S440, in case the description objects required are parsed/extracted object by object and the generation of the at least part of the management tree has not been completed, the operational sequence returns to the operation S420 for parsing/extracting a further required description object. Otherwise the generation of the at least part of the management tree is completed and the operational sequence continues with operation S450.

In an operation S450, the resulting at least part of the management tree generated is applied. The applying of the resulting at least part of the management tree may be an establishing of a management tree in a managed client device, an implementing of an additional branch into an existing management tree for adding additional configuration data or settings to the management tree required by one or more device functions and/or applications. Moreover, the resulting at least part of the management tree may have been generated by a management server and transmitted to a managed client to be implemented therein.

The applying of the resulting at least part of the management tree should been understood in conjunction with the above described SyncML device management service and the exchange of a management document.

In an operation S460, the operational sequence for creating/generating at least a pert of a management tree in accordance with a device description framework (DDF) and a DDF document according to an embodiment of the invention is finished, respectively.

Figure 5A:
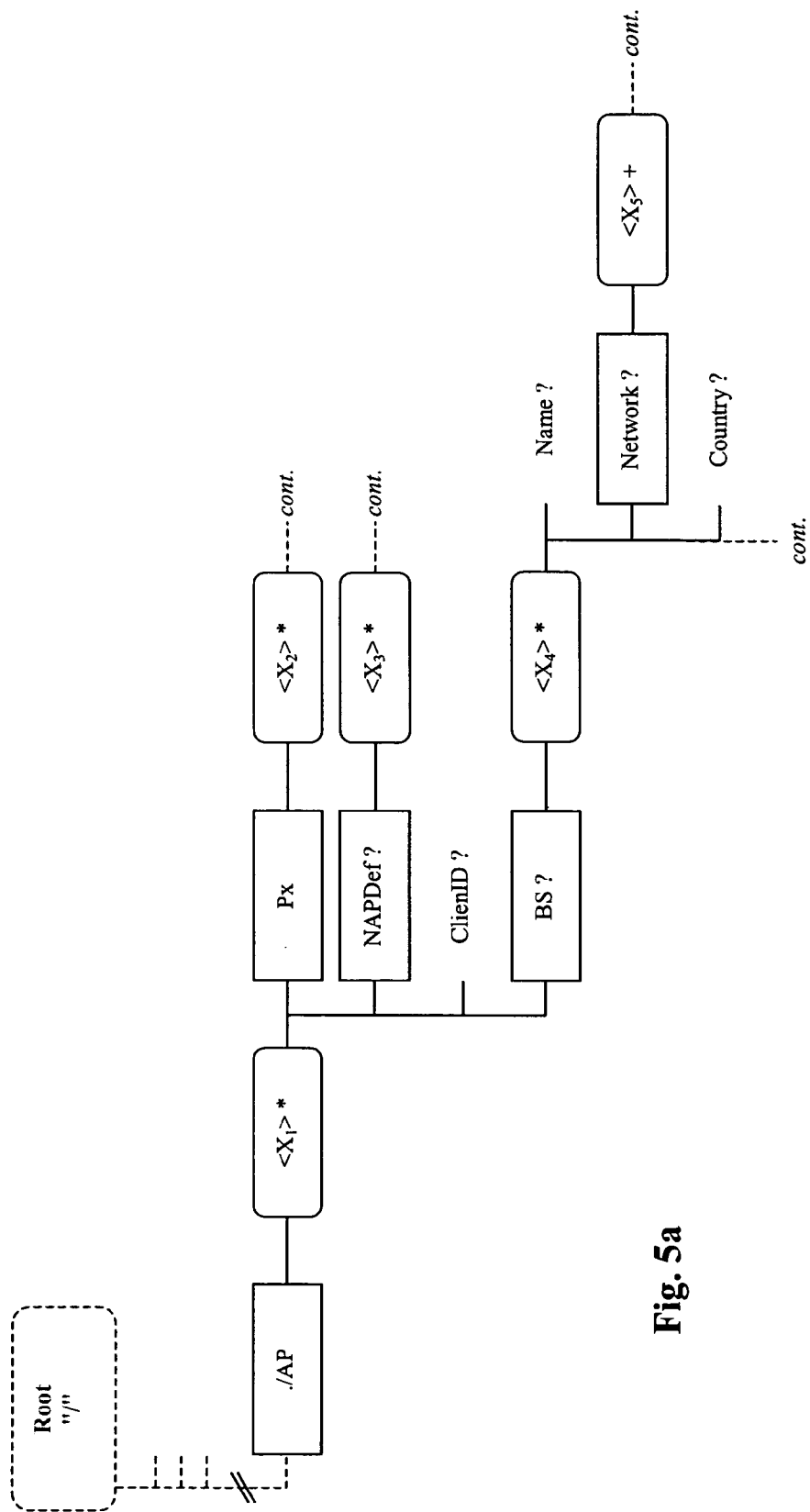
FIG. 5a shows an example excerpt of a graphical depiction of a device description framework in accordance with an embodiment of the invention.

The following FIG. 5a will show a graphical depiction of an example part of a device description framework. The FIG. 5b and FIG. 5c show the corresponding DDF document.

FIG. 5a shows an example part of a graphical depiction of a device description framework in accordance with an embodiment of the invention. The graphical depiction relates to the access point (AP) settings of a mobile data communication enabled client device. The graphical depiction shows a part of the relevant description objects being based on that one or more branches of the management tree of the mobile data communication enabled client device are derived.

The access point settings are sub-summarized below a highest level interior node "./AP" directly associated to the root node "/", i.e. the node "./AP" is a child node of the root node "/" and is a parent node to all access point (AP) settings. Correspondingly, the depicted highest level description object "./AP" defines a fixed parent object with the instant identifier "./AP". The fixed parent object "./AP" is associated to a run-time object $<X_1>*$ arranged subordinate thereto. The run-time object $<X_1>*$ allows derivation of none, one or more corresponding interior nodes with dynamically defined instant identifiers being child nodes of the corresponding interior parent node "./AP". Each set of information relating to individual access point settings is stored in one of the management tree structure below one of the interior nodes derived from the run-time object $<X_1>*$. The instant identifier of these interior nodes indicate preferably the kind of access point to which the individual access point settings relate.

The run-time object $<X_1>*$ is associated with a fixed parent object "Px", a fixed parent object "NAPDef?", a leaf object "ClientID?" and a fixed parent object "BS?". Corresponding nodes derived from the these object are allowed to occur not or exactly once in the management tree subordinate to one of the one or more interior nodes derived from the run-time object $<X_1>*$. The corresponding nodes can be added dynamically to the management tree.

The fixed parent object "Px" is parent object to a run-time object $<X_2>*$, the fixed parent object "NAPDef?" is parent object to a run-time object $<X_3>*$ and the fixed parent object "BS?" is parent object to a run-time object $<X_4>*$. Assuming that an interior node "Px" corresponding to the fixed parent object "Px" is existing in the management tree the interior node "Px" may have none, one or more interior nodes with dynamically defined instant identifier, corresponding to the run-time object $<X_2>*$. Analogously, on assumption that an interior node "NAPDef" corresponding to the fixed parent object "NAPDef?" is existing in the management tree the interior node "NAPDef" may have none, one or more interior nodes with dynamically defined instant identifier, corresponding to the run-time object $<X_3>*$ and on assumption that an interior node "BS" corresponding to the fixed parent object "BS?" is existing in the management tree the interior node "BS" may have none, one or more interior nodes with dynamically defined instant identifier, corresponding to the run-time object <X$_4$>*. The further structures of the run-time objects <X$_2$>* and <X$_3$>* are omitted.

The run-time object <X$_4$>* has several child objects comprising among other for example a leaf object "Name?", a fixed parent object "Network?" and a leaf object "Country?". That means, to each interior node generated in accordance with the run-time object <X$_4$>*, a leaf node "Name", an interior node "Network" and a leaf node "Country" are allowed for being associated as child nodes once or are allowed for not being associated.

In turn, the fixed parent object "Network?" is associated to a run-time object <X5>+ being arranged subordinate thereto. According to the definition of the run-time object <X5>+ in case an interior node "Network" corresponding to the fixed parent object "Network?" is existing at least one or more interior nodes with dynamically defined instant identifier, corresponding to the run-time object <X$_5$>+ are associated to the interior node "Network" as interior child nodes.

It can be seen, that run-time objects in the depicted structure are always separated by at least one fixed parent node, that a consecutive arranging of fixed parent objects has avoid and that not different types of run-time objects coexists as child objects of one superordinate (fixed/run-time) parent object such that the depiction fulfills the above described rules and regulations, respectively.

The graphical depiction of the device description framework may be employed for obtaining a corresponding DDF document. The meanings of the graphical elements comprised by the graphical depiction may be translated into the corresponding DDF document to at least obtain a framework of the DDF document.

FIG. 5b shows a first part of an excerpt of a DDF document corresponding to the graphical depiction shown in FIG. 5a. FIG. 5c shows a second part of the excerpt of the DDF document shown in FIG. 5b. In the following, the FIG. 5b and FIG. 5c will be described together.

The following DDF document excerpts are based on an extended markup language (XML) encoding of the device description framework. The XML encoding is moreover based on a document type description defining tags for defining the objects and their properties in a manner such that the resulting DDF document is interpretable in a unique way. The XML encoding is one of a board number of possible encoding methods. The following DDF document is based on a document type description for device description framework provided by the SyncML Initiative.

Lines 001 to 007 include the header section of the DDF document. The header sections defines the XML encoding version (1.0), a character encoding (UTF-8), the version of the DTD to be considered (1.1), a manufacturer (Nokia) a model identification (omitted by comment) of the client device to which the DDF document relates.

In lines 008 to 018 the part of the XML encoded DDF document is comprises that is dedicated to the fixed object "AP", its position in the management tree relative to the root node "/" and the property elements of the fixed object "AP". In correspondence with the aforementioned properties of the fixed object "AP", a set of object property elements specify the properties of the interior node "AP" derived therefrom. In detail, the access is limited to read operations, the format of the object is set to node such that an interior node is derived, the occurrence is defined as one and the scope is permanent, Additionally, a human readable description and a human readable title are defined.

In lines 019 to 026 the run-time object <X$_1$>* is defined. A node name is omitted, since the instance identifier of the node being derived therefrom is assigned at run-time. The object property elements specify the access to add, delete, get and replace, the format of the object is defined as node, the occurrence is none, one or more (ZeroOrMore) and the scope is dynamic. A human readable title is defined.

In lines 027 to 037 the fixed parent object "Px" is specified. The node name is correspondingly defined as "Px". The object property elements specify the access limited to read operations (get), the format of the object is defined as node, the occurrence is one and the scope is dynamic. A human readable title is defined.

In line 036 omission marks indicate the position in the depicted DDF document at which the specification of the run-time object <X$_2$>* is to be included. The specification of the run-time object <X$_2$>* is performed analogously to the specification of run-time objects presented herein.

In lines 038 to 048 the fixed parent object "NAPDef?" is specified. The node name is correspondingly defined as "NAPDef". The object property elements specify the access limited to read operations (get), the format of the object is defined as node, the occurrence is none or one and the scope is dynamic. A human readable title is defined.

In line 047 omission marks indicate the position in the depicted DDF document at which the specification of the run-time object <X$_3$>* is to be included. The specification of the run-time object <X$_3$>* is performed analogously to the specification of run-time objects presented herein.

In lines 049 to 059 the leaf object "ClientID?" is specified. The node name is correspondingly defined as "ClientID". The object property elements specify the access to add, delete, get and replace, the format of the object is defined as character format (chr) being a certain leaf node format, the occurrence is none or one and the scope is dynamic. A human readable title is defined. The derived leaf node contains information. The kind of information, i.e. the format of the data representing the information, has to be predefined. Therefore, the corresponding type element (DFType) comprises a MIME type definition of the content to be stored, herein a plain text information.

In lines 060 to 069 the fixed parent object "BS?" is specified. The node name is correspondingly defined as "BS". The object property elements specify the access limited to read operations (get), the format of the object is defined as node, the occurrence is none or one and the scope is dynamic. A human readable title is defined.

In lines 070 to 077 the run-time object <X$_5$>* is defined. A node name is omitted, since the instance identifier of the node being derived therefrom is assigned at run-time. The object property elements specify the access to add, delete, get and replace, the format of the object is defined as node, the occurrence is none, one or more (ZeroOrMore) and the scope is dynamic. A human readable title is defined.

The lines 078 to 088 the leaf object "Name?" is specified. The node name is correspondingly defined as "Name". The object property elements specify the access to add, delete, get and replace, the format of the object is defined as character format (chr) being a certain leaf node format, the occurrence is none or one and the scope is dynamic. A human readable title is defined. The content type is specified by a MIME type definition as being plain text.

The lines 089 to 100 the fixed parent object "Network?" is specified. The node name is correspondingly defined as "Network". The object property elements specify the access limited to read operations (get), the format of the object is defined as node, the occurrence is none or one and the scope is dynamic. A human readable title is defined.

In line 098 omission marks indicate the position in the depicted DDF document at which the specification of the run-time object $<X_5>*$ is to be included. The specification of the run-time object $<X_5>*$ is performed analogously to the specification of run-time objects presented herein.

The lines 101 to 110 the leaf object "Country?" is specified. The node name is correspondingly defined as "Country". The object property elements specify the access to add, delete, get and replace, the format of the object is defined as character format (chr) being a certain leaf node format, the occurrence is none or one and the scope is dynamic. A human readable title is defined. The content type is specified by a MIME type definition as being plain text.

In line 111 omission marks indicate the position in the depicted DDF document at which further objects associated to the run-time object $<X_5>*$ are to be included.

The hierarchical structure of the device description framework shown accordingly by its graphical depiction in FIG. 5a is mapped to the device description framework and the DDF document, respectively, by encapsulating of the specifications presented and described above. Due to the employment of the device description framework and the DDF document, respectively, the hierarchical structure being realized by the encapsulations of the object specification represents a hierarchical template structure of the management tree being derived therefrom. Alternatively, instead of using encapsulating of specifications for defining the hierarchical structure, a path information may be added to object specifications. The path information specifies the position within the hierarchical structure of the corresponding object.

The specification range of the fixed parent object "./AP" covers the object specifications of subordinate arranged description objects beginning in line 007 and ending with line 115 wherein the specification of the fixed parent object "./AP" itself is comprised in this encapsulation.

The specification range of the run-time object $<X_1>*$ covers the object specifications of subordinate arranged description objects beginning in line 018 and ending with line 114 wherein the specification of the run-time object $<X_1>*$ itself is comprised in this encapsulation.

The specification range of the fixed parent object "Px" covers the object specifications of subordinate arranged description objects beginning in line 027 and ending with line 037 wherein the specification of the fixed parent object "Px" itself is comprised in this encapsulation and the omission marks in line 036 indicate omitted object specifications being hierarchically arranged subordinate.

The specification range of the fixed parent object "NAPDef?" covers the object specifications of subordinate arranged description objects beginning in line 038 and ending with line 048 wherein the specification of the fixed parent object "NAPDef?" itself is comprised in this encapsulation and the omission marks in line 047 indicate omitted object specifications being hierarchically arranged subordinate.

The specification range of the fixed parent object "BS?" covers the object specifications of subordinate arranged description objects beginning in line 060 and ending with line 113 wherein the specification of the fixed parent object "BS?" itself is comprised in this encapsulation.

The specification range of the run-time object $<X_4>*$ covers the object specifications of subordinate arranged description objects beginning in line 069 and ending with line 112 wherein the specification of the run-time object $<X_4>*$ itself is comprised in this encapsulation and the omission marks in line 111 indicate omitted object specifications being hierarchically arranged subordinate.

The specification range of the fixed parent object "Network?" covers the object specifications of subordinate arranged description objects beginning in line 089 and ending with line 099 wherein the specification of the fixed parent object "Network?" itself is comprised in this encapsulation.

Figure 6:
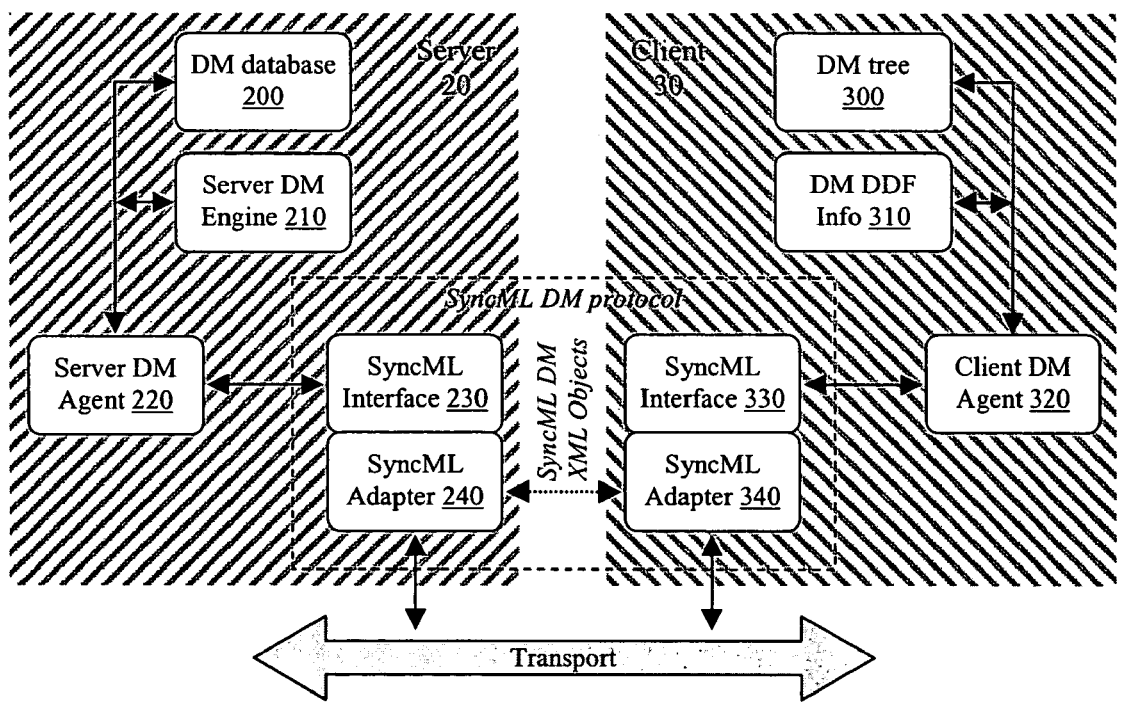
FIG. 6 shows a block diagram illustrating devices containing components for operating the aforementioned methods according to embodiments of the invention.

FIG. 6 shows a block diagram illustrating devices containing components for operating the aforementioned methods according to embodiments of the invention. A server device management agent 220 represents a networked service that provides device management with another counterpart client device management agent 320. The device management data may be provided or processed by the server device management agent 220 or client device management agent 320, respectively. The server device management agent 220 is hosted by the server 20 which may be a server device corresponding with the server device mentioned with reference to FIG. 1. Analogously, the client device management agent 320 is hosted by the client 30 which may be a client device corresponding with the client device mentioned with reference to FIG. 1. The device management is performed between a server 20 and a client 30.

The server 20 and client 30 are connected over any network. The network provides a logical communication connection between the server 20 and client 30, allowing the establishment of the end-to-end communication during the device management which may be termed as device management session. A selection of logical connections and bearers thereof are described in FIG. 1.

The client 30 may use the client device management agent 320 to access the network and send messages to the server via the synchronization adapter 340 and synchronization interface 330 in accordance to the SyncML DM protocol standard. The server 20 or server device management 220, respectively, receives or sends messages via the synchronization adapter 240 and synchronization interface 230, and manages the entire device management process through the server device management engine 210. Device management operations are conceptually bound into a device management frame, which is a conceptual frame for one or more required packages.

The server device management engine 210 has the possibility to access an adapted device management database 200 containing information about the client 30 to be managed such as configuration data and settings relating to certain client device functions or applications running on the client 30 to be transmitted to the client 30 for allowing a user to use well-configured device functions and/or device applications. The device management database 200 may further contain the client related device description framework (DDF) information such as a DDF document defined and provided by the manufacturer for deriving at least a part of the management tree valid for the client device 30, a part of the management tree itself, information about the actual position within the management tree of the client 30 to be processed and further device management relevant information. Further, the server device management engine 210 of the server 20 is able to generate the device management documents exchanged with the client 30. This generation is possible since the DDF information (DDF document) enables the server 20 to code device specific management documents required for being exchanged with the client 30.

The counterpart client 30 is able to response to the management request employing the client device management agent 320. Especially, the client device management agent 320 has access to its device management tree 300 and its device description framework (DDF) 310 defining the hierarchical structure and nodes of the management tree 300.

Both, the server 20 and the client 30 may use the DDF information (DDF document) stored therein in order to code action to be performed against management tree of the client 20. The DDF information (DDF document) allows generation of dynamic part(s) of the management tree required for storing new or dynamic management related information concerning the operation of the client 30. The generating of the part(s) of the management tree being based on the DDF information (DDF document) is operated by the server device management agent 220 and the client device management agent 320, respectively, depending in which device the modifications or adaptations of the management tree 300 are operated.

Primarily, the device description framework (DDF) is supplied by a manufacturer of a certain client device such as client 30 to a device management server such as server 20, such that the server is capable to operate the device management with this client by generating management actions such as described above in a client device appropriate way. Moreover, the DDF information (DDF document) being available to the client 30 allows the client for generating a management tree at switching on of the client 30 in case that no management tree is available for the client 30 up to now. The DDF information (DDF document) serves as mentioned above as a template representing and describing the management tree and the possible management trees in a common, extensible and flexible way, respectively.

The presented components of the server 20 or the client 30, respectively, the server device management agent 220, the server device management engine 210 and the device database 200 respectively, as well as the client device management agent 320 and the device management tree 200, respectively, may be constituted by a data processing device which may be comprised by the server 20 or the client 30, respectively. Further these components may be constituted by a code section for executing on the server 20 or the client 30, respectively, containing instructions for carrying out the necessary processing operations.

It will be obvious for those skilled in the art that as the technology advances, the inventive concept can be implemented in a broad number of ways. The invention and its embodiments are thus not limited to the examples described above but may vary within the scope of the claims.

The invention claimed is:

1. A method for managing mobile communication, comprising:
    defining at least one new object to be associated to a parent object arranged directly superordinate to said new object, and part of a hierarchical object structure comprising a plurality of objects being hierarchically associated;
    wherein said plurality of objects comprises different types of objects out of a group including at least a fixed object, a run-time object, a leaf object, and a link object; wherein said fixed object type has a fixed title, and wherein said run-time object has a title defined during run-time;
    checking said type of said parent object; and
    wherein if said parent object is of said fixed object type, defining said new object having a type out of a group comprising said fixed object, said run-time object said leaf object and said link object; and
    wherein if said parent object is of said run-time object type, defining said new object having a type out of a group comprising said fixed object, said leaf object and said link object;
    defining properties of said new object;
    wherein said plurality of objects serves as template object for deriving corresponding nodes;
    wherein said hierarchical object structure serves as a template structure for deriving hierarchical node structures; and
    wherein said hierarchical node structure comprising a plurality of said nodes is employed for distributing management related information of an electronic device among said plurality of nodes, certain parts of said management related information being assigned to at least one of said plurality of nodes.

2. The method according to claim 1, comprising:
    checking whether said parent object has already one or more associated objects being directly arranged subordinate to said parent object;
    wherein if at least one of said one or more already existing objects is of said run-time object type, rejecting said defining of said new object.

3. The method according to claim 1, comprising:
    checking whether said parent object is of said fixed object type;
    checking whether said parent object has already one or more associated objects being directly arranged subordinate thereto; and
    checking whether said new object is of said fixed object type;
        wherein if said parent object has no already associated objects and said parent object and said new object are of said fixed objects type, concentrating said parent object and said new object by replacing said parent object and said new object with one combined new object being of a fixed object type.

4. The method according to claim 1, comprising:
    coding at least a part of a description document being based on said definition of said new object and comprising information relating to said new object and said properties of said new object;
        wherein said coded description document allowing for generating a hierarchical node structure for storing said management related information.

5. The method according to claim 1, wherein said hierarchical object structure is an information being part of the device description framework; and
    wherein said hierarchical node structure is a management tree employed for device management according to the synchronization markup language device management standard defined by the SyncML Initiative.

6. The method according to claim 1, wherein a description document is at least a part of a device description framework document, said device description framework document being an extended markup language encoded document being encoded in accordance with a corresponding description framework document type description.

7. A software tool for defining a hierarchical structure consisting of a plurality of entities, comprising program portions for carrying out the operations of claim 1 when said program is implemented in a computer program for being executed on a processing device, a networked device, a networked server, a terminal device or a communication terminal device.

8. A computer program product for defining a hierarchical structure consisting of a plurality of entities, comprising loadable program code sections for carrying out the operations of claim 1 when said computer program is executed on a processing device, a networked device, a networked server, a terminal device or a communication terminal device.

9. A computer program product for defining a hierarchical structure consisting of a plurality of entities, wherein said computer program product comprises program code sections stored on a computer readable medium for carrying out the method of claim 1 when said computer program product is executed on a processing device, a networked device, a networked server, a terminal device or a communication terminal device.

10. A computer data signal embodied in a carrier wave and representing a program which, when executed by a processor, causes the method of claim 1 to be carried out.

11. An apparatus, comprising:
a processing unit for defining at least one new object to be included into a hierarchical object structure comprising a plurality of objects being hierarchically associated;
a memory unit; and
a communication interface;
wherein said plurality of objects comprising different types of objects out of a group including at least a fixed object, a run-time object, a leaf object and a link object;
wherein said fixed object type has a fixed title, and wherein of said run-time object has a title defined during run-time;
wherein said processing unit is configured for;
checking said type of said parent object; and
wherein if said parent object is of said fixed object type, defining said new object having a type out of a group comprising said fixed object, said run-time object, said leaf object and said link object; and
wherein if said parent object is of said run-time object type, defining said new object having a type out of a group comprising said fixed object, said leaf object and said link object;
defining properties of said new object;
wherein said plurality of objects serves as template object for deriving corresponding nodes;
wherein said hierarchical object structure serves as a template structure for deriving hierarchical node structures; and
wherein said hierarchical node structure comprising a plurality of said nodes is employed for distributing management related information of an electronic device among said plurality of nodes, certain parts of said management related information being assigned to at least one of said plurality of nodes.

12. A management system, comprising:
a managed mobile communication enabled device; and
a hierarchical object structure comprising a plurality of objects being hierarchically associated;
wherein each object of said plurality of objects has a certain object type which is an object type out of the group comprising at least fixed object, run-time object, leaf object and link object;
wherein said fixed object type has a fixed title, and wherein said run-time object has a title defined during run-time;
wherein if a parent object, which is directly arranged superordinate to at least one new object to be defined and is part of said hierarchical object structure has said fixed object type, said at least one new object has a type out of a group comprising said fixed object type, said run-time object type, said leaf object type and said link object type; and
wherein if said parent object has said run-time object type, said at least one new object has a type out of a group comprising said fixed object type, said leaf object type and said link object type;
wherein said hierarchical object structure being constituted by said plurality of objects describes and allows generation of a hierarchical node structure constituted by a plurality of nodes;
wherein said hierarchical node structure comprising said plurality of nodes is employed for distributing management related information of said managed mobile communication enabled device among said plurality of nodes, certain parts of said management related information being assigned to at least one of said plurality of nodes;
wherein said managed mobile communication enabled device comprises a device management agent configured to generate at least a part of said hierarchical node structure from said hierarchical object structure to establish said part of said hierarchical node structure and to implement said part of said hierarchical node structure into said managed mobile communication enabled device;
wherein said device management agent is configured to distribute management related information among said plurality of nodes constituting said hierarchical node structure; and
wherein said device management agent is configured to retrieve at least parts of said management related information from one or more nodes of said plurality of nodes for configuring functions of at least one out of said managed mobile communication enabled device and applications running on said managed mobile communication enabled device to be operable.

13. A management system according to claim 12, wherein each object of said plurality of objects is allowed to have only one directly subordinate arranged object which has said run-time object type.

14. A management system according to claim 12, wherein said hierarchical object structure has a concentrated object which has said fixed object type,
wherein said concentrated object is constructed from a parent object and a child object,
wherein said parent object is an object which is directly arranged superordinate to said child object; and
wherein said concentrated object is implemented if
said parent object has said fixed object type;
said child object has said fixed object type; and
said child object is the only object which is directly arranged subordinate to said parent object.

15. A management system, comprising:
a managed mobile communication enabled device; and
a hierarchical node structure comprising a plurality of nodes for distributing management related information of said managed mobile communication enabled device among said plurality of nodes, certain parts of said management related information being assigned to at least one of said plurality of nodes;
wherein each node of said plurality of nodes has a certain node type which is a node type out of the group comprising at least fixed node, run-time node, leaf node and link node;

wherein said fixed object type has a fixed title, and wherein said run-time object has a title defined during run-time;

wherein if a parent node, which is directly arranged superordinate to one node and is part of said hierarchical node structure, has said fixed node type, said one node has a type out of a group comprising said fixed node type, said run-time node type, said leaf node type and said link node type; and wherein if said parent node has said run-time node type, said one node has a type out of a group comprising said fixed node type, said leaf node type and said link node type;

wherein said managed mobile communication enabled device comprises a device management agent configured to distribute management related information among said plurality of nodes;

wherein said device management agent is configured to retrieve at least parts of said management related information from one or more nodes of said plurality of nodes; and wherein said device management agent is for configuring functions of at least one out of said managed mobile communication enabled device and applications running on said managed mobile communication enabled device to be operable.

16. A management system according to claim 15, wherein two or more child nodes which have said run-time node type and which have a same parent node have a common format;

wherein said parent node is directly superordinate arranged to said two or more child nodes; and wherein said common format determines that management related information distributed among said two or more child nodes having said run-time node type relates to the same function of at least one out of said managed mobile communication enabled device and application running on said managed mobile communication enabled device.

17. A management system according to claim 15, wherein said hierarchical node structure has a concentrated node which has said fixed node type, wherein said concentrated node is constructed from a parent node and a child node, wherein said parent node is a node which is directly arranged superordinate to said child node, and wherein said concentrated node is implemented if
said parent node has said fixed node type;
said child node has said fixed node type; and
said child node is the only node which is directly arranged subordinate to said parent node.

18. An apparatus, comprising:

means for defining at least one new object to be included into a hierarchical object structure comprising a plurality of objects being hierarchically associated;

means for storing data; and means for interfacing communications;

wherein said plurality of objects comprising different types of objects out of a group including at least a fixed object, a run-time object, a leaf object and a link object, wherein said fixed object type has a fixed title, and wherein said run-time object has a title defined during run-time;

wherein said apparatus further comprises:

means for checking said type of said parent object; and wherein if said parent object is of said fixed object type, defining said new object having a type out of a group comprising said fixed object, said run-time object, said leaf object and said link object; and wherein if said parent object is of said run-time object type, defining said new object having a type out of a group comprising said fixed object, said leaf object and said link object;

means for defining properties of said new object;

wherein said plurality of objects serves as template object for deriving corresponding nodes;

wherein said hierarchical object structure serves as a template structure for deriving hierarchical node structures; and wherein said hierarchical node structure comprising a plurality of said nodes is employed for distributing management related information of an electronic device among said plurality of nodes, certain parts of said management related information being assigned to at least one of said plurality of nodes.

* * * * *